United States Patent [19]

Eiberger et al.

[11] Patent Number: 4,725,901
[45] Date of Patent: Feb. 16, 1988

[54] METHOD FOR ADAPTIVE REMOVAL OF DISTORTION FROM BINARY CODED DIGITAL SIGNALS

[75] Inventors: Berthold Eiberger; Roland Mester, both of Darmstadt, Fed. Rep. of Germany

[73] Assignee: Robert Bosch GmbH, Stuttgart, Fed. Rep. of Germany

[21] Appl. No.: 805,444

[22] Filed: Dec. 5, 1985

[30] Foreign Application Priority Data

Dec. 14, 1984 [DE] Fed. Rep. of Germany ....... 3445551

[51] Int. Cl.⁴ ................................................. G11B 5/09
[52] U.S. Cl. ........................................... 360/45; 360/46
[58] Field of Search ..................... 360/46, 45, 36.2, 32, 360/65, 67, 68

[56] References Cited

U.S. PATENT DOCUMENTS 3,007,010 10/1961 Brath et al. ............................ 360/65
4,167,761 9/1979 Best ....................................... 360/45

Primary Examiner—Vincent P. Canney
Attorney, Agent, or Firm—Frishauf, Holtz, Goodman & Woodward

[57] ABSTRACT

Digital color television signals intended to be recorded in serial bit form are first subjected to predistortion to compensate for nonlinear distortion digitally computed for each serial bit on the basis of the pattern established by a predetermined number of precursor bits, which requires digital to analog conversion of the multibit parallel output of the predistortion computation. The converted output is then filtered on an analog basis to compensate for linear distortion, as by emphasizing the higher frequencies. In reproduction, the similar combination of analog and digital distortion compensation is used, first filtering and then, after retrieving the bit clocking frequency and phase, analog to digital conversion and compensation for nonlinear distortion by programmed interpretation of a parallel multibit input to select correctly the bits of an output serial bit stream. The latter can be subjected to conversion into the usual eight bit parallel color television signals. The combination of both programmed digital distortion compensation and analog compensation of linear distortion not only reduces the output bit error rate, but has the advantages of being adaptive in that a test bit sequence can be used to select the most effective program for correcting nonlinear distortion for a particular system of recording channel, record medium and reproduction channel, provided that the nonlinear distortion compensators use RAMs, so that the best variety of nonlinear distortion correction for a particular equipment and/or tape can quickly be selected.

13 Claims, 6 Drawing Figures

METHOD FOR ADAPTIVE REMOVAL OF DISTORTION FROM BINARY CODED DIGITAL SIGNALS

This invention concerns the removal of both linear and non-linear effects to which binary coded digital signals are subject when recorded on magnetic tape in order to reduce the bit error rate in reproduction.

In the recording of digital video signals on a magnetic tape, it is necessary to prevent distortion of the reproduced signals by the head-tape-head system used for recording. The usual measures for reducing distortion are limited to providing linear preemphasis in the recording part of the operation, and to providing amplitude and group propagation time correction in the signal reproduction path.

In the technical area of magnetic recording of data in computer systems, auxiliary equipment is known for dealing, on the recording side of the process, with non-linear distortion which is generally referred to as "write precompensation".

The removal of distortion in the data stream coming from a tape is an important element in the digital recording of video data on magnetic tape, since at the high data rates (100 megabit/sec.) the bit error rate is largely determined by the quality of the distortion elimination.

The compensation and the optimization of the operation of the equipment is as a rule performed manually; different tape-and-head systems each require individual distortion elimination. Exact compensation is only approximately possible and non-linear effects cannot be eliminated as a rule.

For these reasons, automatic distortion compensation or elimination which dynamically adapts itself to the heat-and-tape system is not known at the present time.

SUMMARY OF THE INVENTION

It is an object of the present invention to provide a system for compensating out or otherwise eliminating errors in the recoding and reproduction of digital signals in a manner that adjusts itself to the particular tape-and-head system.

Briefly, a partly digital and partly analog system is used which makes possible continuous adaptive adjustment of the distortion removal. The analog part of the system reduces linear distortion and a digital distortion compensator deals with the nonlinear distortion and usually some linear distortion also.

This arrangement has the advantage that it makes possible continuous adaptive adjustment of the distortion removal. In contrast to the practice heretofore, it is possible to remove distortion, not only from a few data sequences of limited length that are regarded as particularly critical, but from any possible bit sequence over whatever sequence length that is deemed to be significant and economical. This is particularly advantageous since it permits the use of different tape materials and makes possible optimization during reproduction.

The combination of linear and nonlinear distortion compensation or removal leads to a substantial reduction of the bit error rate that appears in digital magnetic data recording.

BRIEF DESCRIPTION OF THE DRAWINGS

The invention is further described by way of illustrative example with reference to the annexed drawings, in which:

FIG. 4 shows an example of the content of a look-up table in random access memory of unit 4 of FIG. 2 listing output values for the case of linear compensatory predistortion and for the case of non-linear compensatory predistortion;

FIG. 5 is a pulse diagram illustrating the operation of the table of FIG. 4, and FIG. 6 shows a table for compensatory non-linear predistortion in random access memory of unit 16 of FIG. 3 for the case in which a binary signal changes state for one bit between sequences of two bits of the opposite state.

DESCRIPTION OF THE ILLUSTRATED EMBODIMENTS

Figure 1:
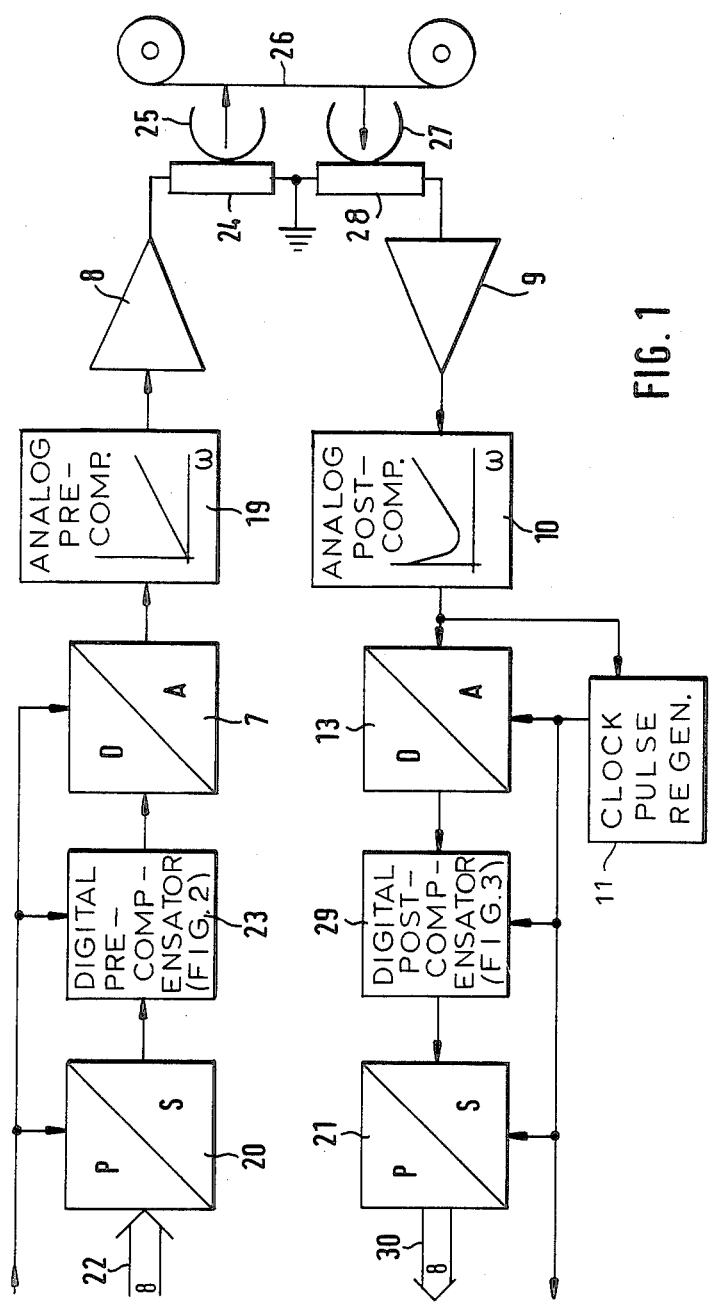
FIG. 1 is a block circuit diagram schematically representing the principle of the recording and reproduction system of a digital video recorder.

FIG. 1 shows in block diagram a basic representation of the recording and reproduction system of a video recorder for digital signals with linear and nonlinear distortion removal from the transmission channel in accordance with the invention.

The digital color television signals entering at the input 22 of the circuit in the form of 8 bit wide parallel data are first converted into serial form in the parallel-to-series converter 20, which may be constituted as a shift register, the output of which is then supplied to the precompensator 23 which produces a parallel-bit output for each input bit. The constitution and manner of operation of this digital distortion-precompensator 23 are explained farther below in connection with FIG. 2. The precompensated data are then converted into analog form in the digital to analog converter 7 to produce precompensated amplitude shapes for each original digital bit, after which the signals are subject to linear distortion-compensation, for example by emphasis of the higher frequencies, in the compensator 19, which provides an output to the recording amplifier 8 for amplification. The compensated and amplified signals are then applied to the coils 24 of the magnetic transducer or "head" 25 for recording on the magnetic tape 26. The magnetic transducer 25 and its coil 24 symbolically represents all the recording magnetic heads of a video tape equipment, which according to the recording format may be disposed in a multiplicity around the circumference of a rotating head wheel for cyclically recording a succession of tracks on the tape in a well known way.

The distortion compensation can be provided entirely before recording, entirely after recording and preamplified pick-up, or partly before and partly after recording. The following paragraph describes post-recording compensation as if it provided all the the compensation.

The pickup and reproduction branch of the circuit of FIG. 1 has a pickup or reproduction magnetic head 27 having a transducer coil 28. The head 27 can be identical with the magnetic head 25 and it is also possible for the coils 28 and 24 to be identical. The magnetic transducer 27 likewise may represent multiplicity of pickup heads on a rotating head wheel, in which case it is also possible for each pickup head to have its own pickup amplifier 9. The reproduction distortion compensator 10 serves to compensate for the frequency transmission characteristic of the system composed of the tape, the magnetic head and the reproduction amplfier. The linear compensators 10 and 19 are well known in the art and do not need to be further described here. Their properties, in accordance with common practice, are of course determined in part by the amplification characteristics respectively of the recording amplifier 8 and the pickup amplifier 9. They are, in general, electrical networks that may be called "filters" or "equalizers" as may be appropriate in the particular case.

The reproduced analog signal as compensated for linear distortion, is then supplied to a synchronization signal regenerator 11, which derives a clock signal for clocking the stages that follow after the distortion compensator 10. These stages are an analog to digital converter 13 providing a multibit parallel output, a digital distortion compensator 29 providing a serial bit output and a serial to parallel converter 21. These stages produce, at the output 30 of the serial to parallel converter, an 8-bit parallel output signal corresponding to the input signal at the input 22 of FIG. 1.

Figure 2:
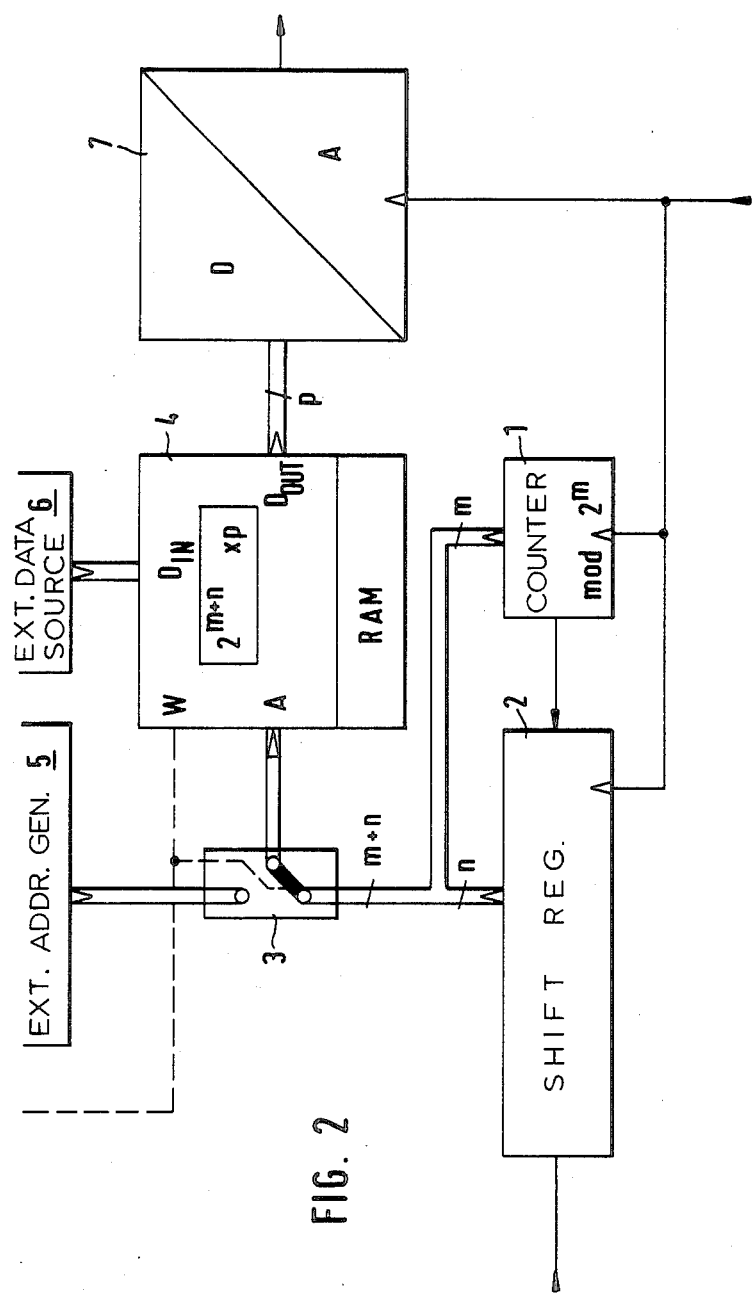
FIG. 2 is a block circuit diagram of the constitution of the digital recompensation unit of FIG. 1.

FIG. 2 shows the general form of the nonlinear distortion-precompensator on the recording side of the system. An modulo 2 counter 1 subdivides the clocking of the serial bit input data into $2^m$ phases identified in each case by the m bits of the count. An n-stage shift register 2 receives each currently present bit of the serial data stream as well as its $n-1$ immediate precursors. By the multiple subdivision of a single clocking phase by means of the modulo $2^m$ counting, counter 1 makes it possible to obtain an increase of the recording level at the flanks of the signal and to produce an offset of the flanks in a manner dependent upon the pattern of the precursor bits of the current bit. Thus, for example, after a sequence of data bits which are represented by an identical level in the NRZ code, the need may arise to raise the initial level of the first next succeeding bit or even of the one after that in order to compensate for base line drift. Likewise, the flanks can be offset in time in recording, by time shift of the output bit, in order to counteract what is known as the "peak-shaft" effect in reproduction.

For the purpose just described, the $m+n$ available bits of data information are applied by multiplexer 3 to the $m+n$ address inputs of a random access memory (RAM)4. The address inputs of the RAM can be connected for loading the RAM information by way of the multiplexer 3 to both an external address generator 5 and an external data source 6. The programming of the multibit output of the RAM for every possible pattern made up of a current bit and $n-1$ precursor bits, taking account of $n-1$ previous RAM outputs, is well understood in the practice, above referred to,.of "write precompensation" and does not need to be described here, but is simply illustrated by our example (m=1, n=3, p=2) in FIG. 4 and FIG. 5.

The data outputs, p in number, of the RAM control a digital to analog converter 7, the output voltage of which diretly controls the recording amplifier 8.

The recording signal is produced as any desired coding of the currently present data bit and its $n-1$ precursors. The control of the recording amplifier, moreover, can additionally be changed in the different clocking phases, so that signal emphasis at the flanks and a flank offset can be produced.

A special case of the distortion precompensation on the recording side of the system is provided when the freely programmable RAM above-described is replaced by a fixedly programmed PROM or by gate logic. The determination of the values of m, n and p depends upon the particular case, with the understanding that $m \geq 0$, $N \geq 1$ and $p \geq 1$.

Figure 3:
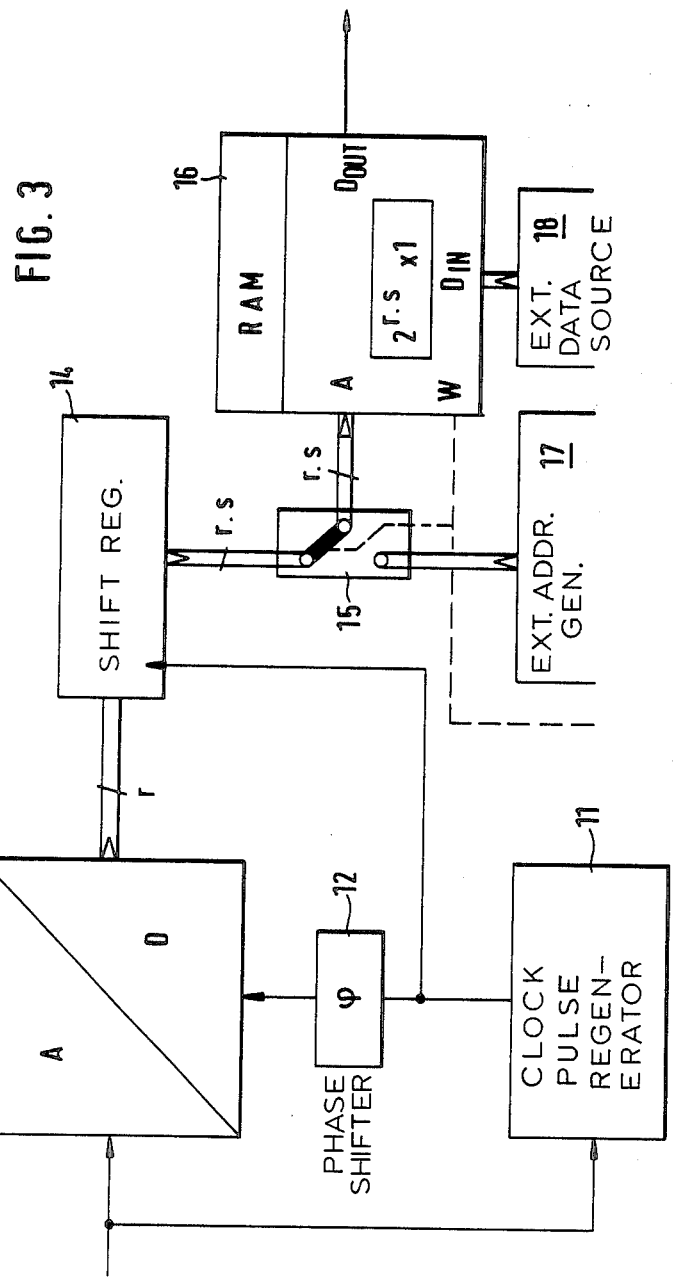
FIG. 3 is a block circuit diagram of the digital distortion compensator in the reproduction path of the circuit of FIG. 1.

FIG. 3 shows the general constitution of the distortion compensator on the receiving side. After linear preemphasis 10, the clock pulses for the serially recorded data can be recovered in the clock pulse regenerator 11.

The sampling instants of the analog to digital converter 13 are determined by a phase shifter 12. The r bit output values of the analog to digital converter are supplied to an s-stage shift register 14 in which the data are advanced at the bit sequence rate. At the r.s parallel outputs of the shift register, there is present at any time detailed information regarding the bit currently entered into the shift register and its $s-1$ precursors. All that information is supplied through the multiplexer 15 to the address inputs of a RAM 16. The information regarding the currently arriving bit and its precursors can be used for both linear and nonlinear distortion compensation for the input signal. The RAM can be provided for any desired linear or nonlinear algorithm for digital filtering of the input data by means of the external loading address 17 and the external data source 18. These algorithms, like those of "write precompensation" used in recording of high speed data in computing systems, are well known and do therefore need to be illustrated here, especially since they are made to fit particular recording equipment and/or tape characteristics but a simple case in which $r=2$ and $s=5$ is illustrated in FIG. 6.

FIG. 6 shows only the programming for the output $D_{out}$ of the RAM 16 corresponding to the signal sample $n_0$ appearing at the middle output of the shift register 14 when that register is a five place register ($s=5$), and it shows a full content of the shift register only for two specific cases identified in FIG. 6 as "Case 1" and "Case 2". In the tabulation at the bottom of FIG. 6 of the values provided by the shift register, the first row corresponds to Case 1 and the last row corresponds to Case 2. The intermediate four rows are intended to cover all other cases which for this particular signal sample $n_0$ are set forth as depending only upon the middle output of the shift register, providing the RAM address $A_5 A_4$. Since the two middle rows of that tabulation respectively have the same middle outputs $n_0$ of the shift register as Case 1 and Case 2, but provide different RAM outputs, FIG. 6 specifies that the "don't care" designations xx' and xx" for the other shift register outputs in the two middle rows necessarily exclude the combinations of outputs respectively set forth in the top line and in the bottom line of the table, but they may have any other combination of values expresssible by the two bits of a digital signal provided by the analog to digital converter 13 for outputs $n-2$, $n-1$, $n+1$ and $n+2$. When the freely programmable RAM is replaced by a fixedly programmed PROM or by gate logic, having a fixed program found to be appropriate for the particular type of tape, a special case of particular interest is constituted.

It should be noted that the numbers r and s may not be zero or negative, i.e., $r \geq 1$ and $s \geq 1$.

Optimization of the distortion compensation in the digital part of the compensator can be carried out at the beginning of the tape or during the reproduction by means of a test pattern recorded on the magnetic tape. This optimization is performed by simply loading anew the RAMs of the digital distortion compensators in a manner determined by the application of particular recorded test sequences and the reporting of the transmission errors resulting therefrom.

Although the invention has been described with reference to a particular illustrative example, it will be seen that modifications and variations are possible within the inventive concept.

We claim:

1. Method of reducing distortion of digital serial-bit-form binary coded data signals in magnetic recording and reproduction thereof comprising the steps of:
    distorting the amplitude profile of each individual bit portion of said signals to an extent and in a manner determined by the binary pattern of a predetermined number of precursor bits of each bit by producing a plural-bit digital output for each said individual bit portion of said signals in accordance with a predetermined program, for compensation of nonlinear distortion, followed by utilizing said plural bit signals to produce for each said individual bit portion a distorted amplitude profile of a larger number of possible levels than said binary coded data signals;
    subjecting said signals of distorted amplitude profile produced from said plural-bit output to passage through an electrical network having a distorting frequency-transmission characteristic for compensation of linear distortion to produce precompensated signals, and
    thereafter magnetically recording a frequency modulated wave modulated by said precompensated signals.

2. Method according to claim 1, wherein a preliminary procedure is used whereby a predetermined test signal sequence is subjected to at least said step for compensation of linear distortion in a recording and reproduction loop for selection of a program suitable for said step of compensation of nonlinear distortion, after which the same test signal sequence is subjected to both distortion compensation steps in said loop for confirmation of the selected program.

3. Method according to claim 2, in which said program enables the step of compensation for nonlinear distortion to provide also a partial compensation of a linear distortion.

4. Method according to claim 1, wherein said compensation steps are performed before recording of said signals, by first performing said step for compensation of nonlinear distortion to produce a parallel multibit output for each said individual bit input, then producing a predistorted analog signal output corresponding to said individual bit input by digital to analog conversion of said parallel multibit output and thereafter subjecting said predistorted analog signal output to said network having a distorting frequency-transmission characteristic.

5. Method according to claim 4, in which said program enables the step of compensation for nonlinear distortion to provide also a partial compensation of a linear distortion.

6. Method according to claim 1, in which said program enables the step of compensation for nonlinear distortion to provide also a partial compensation of a linear distortion.

7. Method according to claim 6, in which said program enables the step of compensation for nonlinear distortion to provide also a partial compensation of a linear distortion.

8. Method of reducing distortion of digital serial-bit-form binary coded data signals after magnetic recording and pick-up preamplification of recorded signals, comprising the steps of:
    subjecting said picked-up signals to an electrical network having a distorting frequency-transmission characteristic for compensation of linear distortion;
    then deriving bit rate clocking signals from the output of said network;
    then converting the output of said network to a sequence of parallel multibit signals in which each multibit signal corresponds to a single bit rate interval of said clocking signals; and
    then providing compensation of nonlinear distortion by producing a single bit of a serial bit stream for each said parallel multibit signal in accordance with a predetermined program wherein the content of each said single bit is determined by the combination of the respective contents of the contemporary one of said multibit signals and a predetermined number of its precursors.

9. Method according to claim 8, in which said program enables the step of compensation for nonlinear distortion to provide also a partial compensation of a linear distortion.

10. Method according to claim 5, wherein a preliminary procedure is used whereby a predetermined test signal sequence is subjected to at least said step for compensation of linear distortion in a recording and reproduction loop for selection of a program suitable for said step for compensation of nonlinear distortion, after which the same test signal sequence is subjected to both distortion compensation steps in said loop for confirmation of the selected program.

11. Method according to claim 10, in which said program enables the step of compensation for nonlinear distortion to provide also a partial compensation of a linear distortion.

12. Apparatus for reducing distortion of serial-bit-form binary coded data signals in magnetic recording and reproduction thereof, comprising:
    first means responsive to each individual bit of said data signals and a predetermined number of its precursor bits for producing a multibit output representative of a signal shape relative to time which is capable of compensating for nonlinear distortion of said individual bit in said magnetic recording and reproduction;
    second means for converting said multibit output of said first means into a sequence of multilevel amplitude profiles treatable as analog signal waves, and
    third means, having a distorting frequency-transmission characteristic for compensation of linear distortion, for modifying the output of said second means and supplying signals to the driver amplifier of a magnetic recording apparatus.

13. Apparatus for reducing distortion of serial-bit-form binary coded data signals in magnetic recording and reproduction thereof at a predetermined bit rate, comprising:

first means responsive to a preamplified pick-up of said signals from a magnetic recording thereof, for modifying said preamplified output with reference to a distorting frequency-transmission characteristic of said first means, for compensation of linear distortion of said signal;

means for retrieving from the output of said first means a bit rate clocking signal corresponding to the bit rate for recording and reproduction of said signals in said magnetic recording;

third means responsive to the output of said first and second means for converting said signals as filtered by said second means into multibit digital signals;

fourth means responsive to said multibit digital signals produced by said third means for producing a serial binary bit stream of low error rate in which each bit corresponds to one of said multibit signals and its information content is determined by the corresponding multibit signal and a predetermined number of its precursors.

* * * * *